United States Patent

Meier et al. [19]

[11] 3,726,084
[45] Apr. 10, 1973

[54] APPARATUS FOR SUPERCHARGING AN INTERNAL COMBUSTION ENGINE

[75] Inventors: Erwin Meier, Zurich; Gottlieb Zehnder, Kirchdorf, both of Switzerland

[73] Assignee: Aktiengesellschaft Brown, Boveri & Cie, Baden, Switzerland

[22] Filed: Nov. 25, 1970

[21] Appl. No.: 92,603

[30] Foreign Application Priority Data

Dec. 4, 1969   Switzerland..................18060/69

[52] U.S. Cl..........................................60/13, 60/313
[51] Int. Cl................................................F02b 37/04
[58] Field of Search..................60/32 R, 32 M, 13, 60/313

[56] References Cited

UNITED STATES PATENTS

| | | | |
|---|---|---|---|
| 3,064,417 | 11/1962 | Tryhorn | 60/13 |
| 3,153,318 | 10/1964 | Tryhorn | 60/13 |
| 2,542,756 | 2/1951 | Draminsky | 60/32 R |
| 2,649,083 | 8/1953 | Vogel et al. | 60/32 R |
| 3,298,332 | 1/1967 | Elsbett | 60/13 |
| 3,077,071 | 2/1963 | Leichtfuss | 60/13 |

FOREIGN PATENTS OR APPLICATIONS

| | | | |
|---|---|---|---|
| 352,912 | 8/1931 | Great Britain | 60/32 M |
| 319,426 | 9/1929 | Great Britain | 60/32 M |

Primary Examiner—Carlton R. Croyle
Assistant Examiner—Warren Olsen
Attorney—Pierce, Scheffler & Parker

[57]     ABSTRACT

An arrangement for supercharging an internal combustion engine with an improved pulse-turbocharging system wherein the exhaust pipes from the engine cylinders terminate in nozzles which are connected by way of a combining section with the inlet to a mixing tube, the outlet end from this tube being connected with the inlet to the supercharger. The preexhaust pressure waves from the cylinders are decomposed, during a gas change period, into a main pressure wave component and an auxiliary wave component, and the main and auxiliary pressure wave components are so modulated in the combining section that an admissible backpressure in the exhaust pipe of the respective scavenged cylinders is not exceeded.

4 Claims, 4 Drawing Figures

Inventors
Erwin Meier
Gottlieb Zehnder

By Pierce, Scheffler & Parker
Attorneys

APPARATUS FOR SUPERCHARGING AN INTERNAL COMBUSTION ENGINE

This invention relates to an improved pulse-method for supercharging an internal combustion engine wherein the preexhaust pressure waves of at least five working cylinders are admitted to the inlet of at least one supercharger and where the outlets of the exhaust gas pipes from the cylinders are provided with nozzles, as well as to a device for carrying out the method.

Methods for supercharging internal combustion engines are known which work either in pulse or in constant pressure operation.

The constant pressure operation has the disadvantage of losses of kinetic energy when the exhaust gas enters the receiver. In 2-cycle engines, the turbine has in addition insufficient energy available in partial load operation to be able to work with a freely rotating turboloader without additional compressors. For this reason a mechanically operated auxiliary compressor must usually be added.

In pulse operation, the filling- and evacuation losses appearing in the exhaust pipes and in the turbine, and the turbine ventilation losses in partial admission are a disadvantage. These losses appear when only one or two exhaust pulses per working period of 360° crank angles in the case of two-cycle engines, and 720° crank angles respectively, in the case of four-cycle engines, admit the inlet of the exhaust gas turbine. Another disadvantage of the pulse operation results from the great reflections of the preexhaust pressure waves in the system of the turbine and of the exhaust pipes since, on the one hand, the free turbine cross section is a quantity determined by the loading pressure, exhaust gas temperature and amount of air, and on the other hand, the cross sectional area of the exhaust gas pipes can only be adjusted within narrow limits.

It is known to reduce the pressure at the inlet of the pipe to the mixing tube by using ejector-type constrictions in the exhaust gas pipes to such an extent that a disturbance of the scavenging phase in a very narrow working range of the engine can be partly avoided. There are limits to this possibility, however, since, on the one hand, the transformation of pressure into speed and back again is connected with losses, and, on the other hand, a too great constriction of the exhaust gas pipes increases the preexhaust time too much, due to the greater reflection on the nozzle. In the case of four-cycle engines this leads to an increase of the exhaust work of the pistons and to increased fuel consumption, whereby disturbance of the scavenging process can occur. In two-cycle engines, the scavenging is likewise impaired.

It is also known to supercharge four-cylinder groups with the same or a greater ignition interval than 90° crank angle in two-cycle engines, and 180° crank angle in four-cycle engines respectively in a system in which two cylinders each with 180° crank angle ignition interval in two-cycle engines and 360° crank angle ignition interval respectively in four-cycle engines, are connected to a common exhaust gas pipe and where the exhaust gas of both pipes is fed only to one inlet of the supercharger. For supercharging multiple cylinder groups which have a shorter ignition interval than 90° crank angle in two-cycle engines and 180° respectively in four-cycle engines, it was assumed by those skilled in the art that a combination of the exhaust gas pipes in a similar manner to one gas inlet is impossible, because a disturbance of the scavenging phase by the resulting pressure waves cannot be avoided.

The object of the present invention is to overcome this prejudice of the experts and to reduce or avoid the aerodynamic losses caused by the operation in internal combustion engines with a shorter ignition interval than 900° crank angle in two-cycle engines and 180° respectively in four-cycle engines, and to achieve at the same time absence of reflections of the supercharging system.

The solution to the problem according to the invention is characterized in that at least one preexhaust pressure wave is decomposed during a gas change period into a main pressure wave component and at least one auxiliary pressure wave component and that the main pressure wave and the auxiliary pressure wave components are so modulated that an admissible backpressure in the exhaust gas pipe of the respectively scavenged cylinder is not exceeded.

A device for carrying out the method according to the invention is characterized is that the exhaust gas nozzles open into a modulator which passes over in the direction of flow into a mixing tube which is connected with the inlet of the supercharger.

Another embodiment of the invention is characterized by a reversing tube, closed at one end, for the modulation of the auxiliary pressure wave, which has at its other end a nozzle opening into the modulator, and that the length of the reversing tube is at least equal to the quotient of the triple velocity of sound of the exhaust gases by the nominal speed of the internal combustion engine.

Another embodiment of the invention is characterized in that the nozzles of the exhaust gas pipe and of the reversing tube, if provided, are combined in a node, the cross sectional area of the mixing tube being at least equal to the difference of a 2.5 fold cross sectional area at the narrowest point of a gas exhaust nozzle less half the sum of the cross sectional area at the narrowest point of all other nozzles.

The invention will now be described more fully on the basis of the accompanying drawings wherein.

Figure 1:
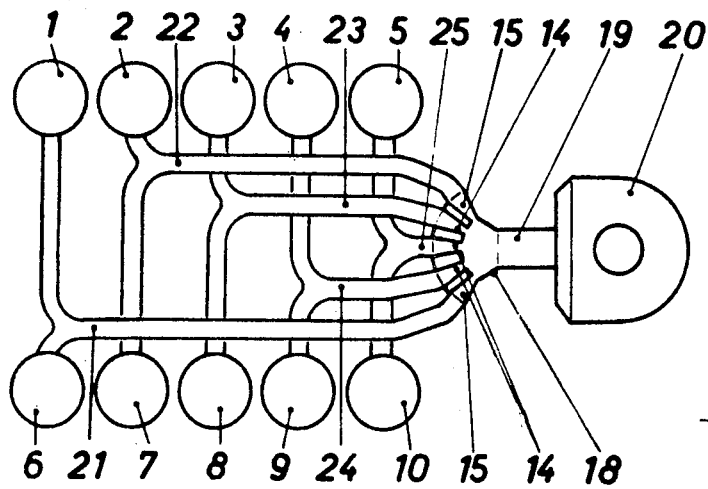
FIG. 1 shows an embodiment of a high-speed 10-cylinder-four cycle-V-engine.

The internal combustion engine represented in FIG. 1 has an ignition sequence which is determined with 1–9–a0–7–5–6–4–8–2–10. The individual cylinders are identified by the reference numbers 1–10, two opposing cylinders each, for example, 2 and 7 being combined in a common exhaust gas pipe (for the indicated cylinders, for example 22). Due to this arrangement, those cylinders will always be combined whose ignition interval is 360° ± V-angle of the respective engine. The expression 360° ± V-angle means that the ignition interval between the individual cylinders relative to each other can in the one case, be 360° + the angle between the two cylinder axes, and in the other case, 360° — the angle between the two cylinder axes. Significant in this connection are the direction of rotation, the particular crank spider and the V-angle. In FIG. 1 for example, the ignition interval between cylinders 1 and 6 which have a common exhaust pipe 21 would result in an angle of 405°. In such case, a clockwise direction of rotation is assumed, with the odd-numbered cylinders shown to the left of the even-numbered cylinders. Also established is a crank spider in five planes, whereby the successive planes of the cranks are offset by 144°, with the angle (V-angle) between the cylinder axes being 45°. Under the same conditions, but with a counter-clockwise direction of rotation, the ignition interval between the two combined cylinders 1 and 6 would amount to 315°.

The five pipe systems thus obtained, through which the exhaust gases are evacuated, are designated with 21–25. Each individual exhaust gas pipe is provided on the end facing the inlet to the supercharger 20 with a nozzle 14, 15. These nozzles are connected by way of the combining section 18 with the inlet to the mixing tube 19, the outlet end of the latter being connected to inlet of the supercharger 20.

In the combining section 18 a preexhaust pressure wave is decomposed into a main pressure wave fed directly to the supercharger and into at least one auxiliary pressure wave, the auxiliary pressure wave propagating in the exhaust gas pipes and in the modulator respectively. By suitable selection of the cross sectional ratio of turbine, exhaust gas pipe, narrowest cross section of the nozzle, and of the nozzle of the modulator, it is possible to influence the amplitudes of the main pressure wave and of the auxiliary pressure wave in such a way that, on the one hand, the supercharger is admitted "quasi reflection free" and, on the other hand, a cylinder which is just scavenging is not disturbed.

It is advisable to select the aspect ratio of the mixing tube-cross section $F_M$ to the effective flow cross section of the supercharger $F_T$ less than 1.7 : 1, the lower limit of the aspect ratio being given by the following equation:

$$F_M/F_T = (5-k/2) \cdot F_E/F_T$$

where $F_M$ = cross section area of mixing tube in cm²
$F_E$ = cross sectional area of exhaust gas pipe nozzles at the narrowest point in cm²
$K$ = number of exhaust gas pipes opening in the combining section.
The ratio $F_M : F_T = 1:1$ is considered the absolute lower limit.

It was found, however, that the desired absence of reflection cannot be achieved by splitting into main- and auxiliary pressure waves alone, and that a time displacement of the auxiliary pressure wave to the main pressure wave by $_L = 30°$ to 40° crank angle is necessary. The length L of the exhaust gas pipes 21 to 25, which must be considered here as the modulator, and which represents the determinant quantity for the time displacement of the auxiliary pressure wave, can be calculated very simply according to the equation:

$$L = (\Phi_L \cdot \bar{a}/12\,n)$$

In this equation L denotes the pipe length in meters as measured from the point where it emerges from the cylinder to the combination point 18, n denotes the nominal speed of the motor revolutions/min, $\Phi_L$ the run time of the preexhaust pressure wave in degree crank angle, and $\bar{a}$ denotes the mean velocity of sound of the exhaust gases in meters per sec. It follows therefore that the length L of the modulator is at least equal to the quotient of the triple velocity of sound $\bar{a}$ by the nominal speed n.

According to the foregoing considerations it is possible that the long pipes, for example, 21 and 22, effect a reflection of the auxiliary pressure wave and thus also a time displacement of the latter. Naturally a prerequisite is always that the exhaust gas pipe under consideration is closed at its engine-side end, i.e. at the end of the exhaust pipe facing the engine.

Figure 2:
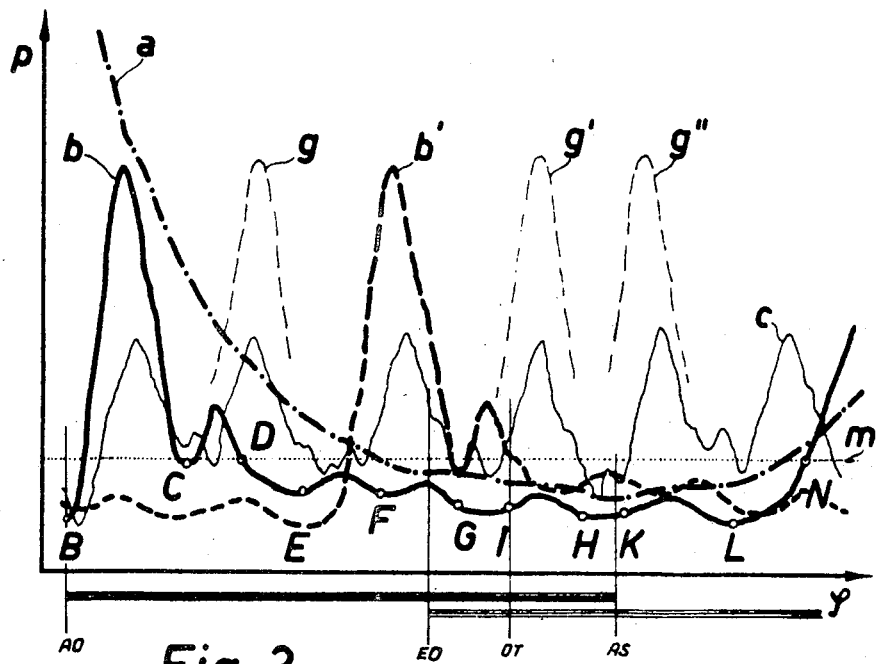
FIG. 2 is a diagram of the pressure course over the crank angle for the internal combustion engine represented in FIG. 1.

But if this requirement is not met by the existing exhaust gas pipes 21 and 25 in any of the working cylinders under consideration, a reversing tube is provided according to the invention, which is not represented in FIG. 1. In order to illustrate the method of operation of the arrangement according to the invention, FIG. 2 shows a diagram for the pressure appearing during the gas change, where the crank angles $\phi$ are entered on the abscissa and the pressure p on the ordinate.

The areas entered under the abscissa represent the valve control times. Point AO denotes "outlet opens" and point AS denotes "outlet closes." EO shows furthermore the opening crank angle of the inlet valve and OT is the upper dead center of cylinder 1. Between the points EO and AS is represented the scavenging of cylinder 1, which would be disturbed by the following preexhaust pressure waves appearing in normal pulse operation. The course of the unreduced preexhaust pressure waves of the following cylinders is represented by the thin broken lines g and g''. The pressure course along the thick dot-dashed line indicates the pressure in cylinder 1 over a part of the expansion-and scavenging range.

The thin dotted line m determines the mean scavenging pressure. The thick solid line b shows the pressure course of the exhaust gases as they appear in the crank angle arc of about 360° under consideration, the pressure being measured in the exhaust pipe system of cylinder 1. The course of the line between the points B–C shows the effect of the pressure wave originating from cylinder 1 in front of this cylinder. D-E show the corresponding pressure wave of cylinder 9, F–G the pressure wave from cylinder 3, I–H the same pressure wave of cylinder 7 and K–L the pressure wave of the exhaust gas current from cylinder 5. It can be recognized that the scavenging of cylinder 1 is in no way disturbed and that the scavenging pressure is exceeded again only at the point N. The pressure wave originating at cylinder 6 and discharged in advance and connecting at point N of FIG. 2, however, cannot cause any disturbance, because none of the cylinders connected to the exhaust pipe under consideration is scavenged during its course That is to say, since at cylinder 1 which is connected jointly with cylinder 6 to exhaust pipe 21, the exhaust valve is already closed at the moment N in time, it cannot interfere with the scavenging function. FIG. 2 shows also that even cylinders 1 and 5 could be connected jointly with one exhaust pipe, and still not interfere with the scavenging phase of cylinder 1.

The thick broken line $b'$ shows the pressure course in the exhaust gas pipe 23 of cylinders 3 and 8 over the same crank angle arc, and it can be seen that the pressure course is displaced principally by the ignition interval between cylinder 1 and cylinder 3.

The thin solid line $c$ represents the course of the main pressure wave fed to supercharger 20, the pressure being measured in mixing tube 19. In order to simplify illustration, only the discharge pressure wave as related to cylinder 1 has been included in FIG. 2. For like reason, only the complete pressure profiles $b$ and $b'$ as measured in the exhaust pipes from cylinders 1 and 3. With respect to pressure profiles $g$, $g'$ and $g''$ as measured respectively in the exhaust pipes from cylinders 9, 7 and 5, only their peak amplitudes have been included. It can be seen from the course of the main pressure wave that the decomposition of the preexhaust pressure waves $g$ to $g'''$ into main-and auxiliary pressure waves results in a pulsation with a higher frequency but smaller amplitude. This has the advantage that there are shorter intervals between two exhaust gas pulses, in which the pressure does not drop to the pressure of the atmosphere, and in addition the exhaust gas turbine can process the supplied pressure pulses quasi reflection-free. Another advantage is that smaller turboloaders can be used than heretofore in this supercharging system, which makes it more economical.

Figure 3:
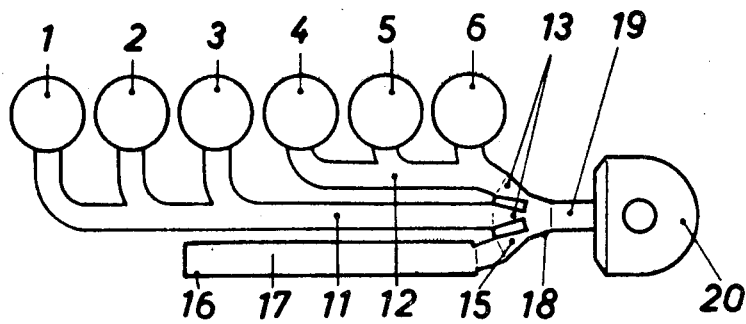
FIG. 3 shows an embodiment of a low-speed six-cylinder-two cycle in-line engine.

FIG. 3 shows another embodiment of the supercharging system according to the invention where the individual cylinders of the engine are designated with 1 to 6. The exhaust gases of cylinders 1 to 3 are fed to the supercharger 20 in one pipe 11 and the exhaust gases from cylinders 4 to 6 in another pipe 12. The ignition sequence of the six-cylinder-two-cycle internal combustion engine is determined with 1–5–3–6–2–4. The exhaust gas pipes 11 and 12 are provided with nozzles 13.

In the combining part 18 the preexhaust pressure wave of a cylinder is decomposed again and the auxiliary pressure wave propagates both in reversing tube 16 and in the free exhaust gas pipe system. When the exhaust gases just issue from one of the cylinders which is connected to the long exhaust gas pipe, a time displacement of the decomposed auxiliary pressure wave according to the invention by the short exhaust gas pipe is not possible because a recalculation of the condition for this embodiment shows a reflection on the turbine and a disturbance of the scavenging process.

In order to avoid values for the aspect ratio of the mixing tube across section $F_M$ to the effective flow across section $F_T$ of the supercharger which are lower than the limit hereinabove established, reversing tube 16 is connected to the combining part 18 over a nozzle 15. The part 18 extends to mixing tube 19 and the latter is connected with the gas inlet of supercharger 20.

Figure 4:
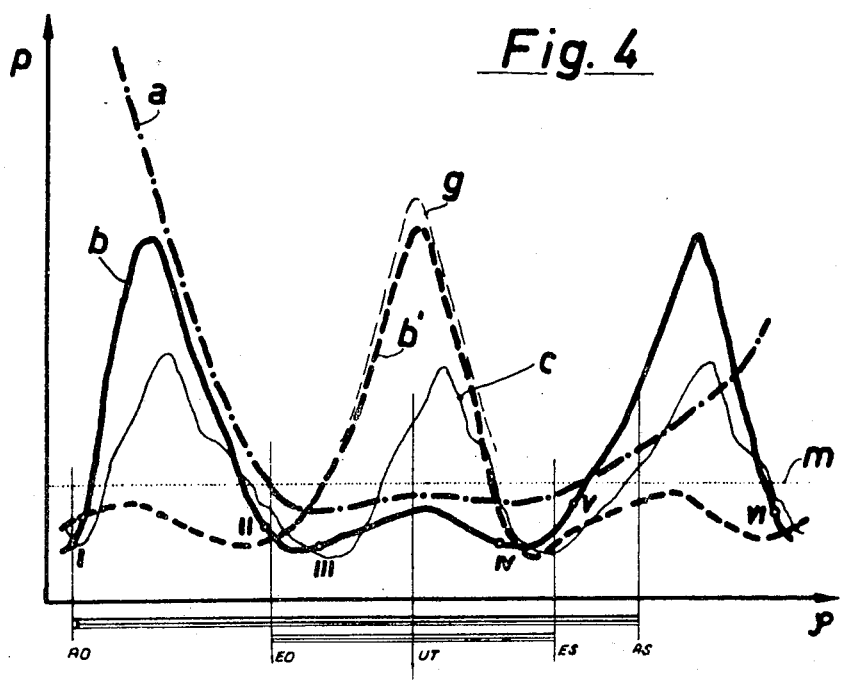
FIG. 4 shows a pressure-crank angle-diagram for the internal combustion engine represented in FIG. 3.

The method of operation mixing tube 16 is described again on the basis of a diagram of the pressure course over the crank angle $\phi$ represented in FIG. 4. The curves which are distinguished by the type and thickness of the lines correspond to those as similarly designated in FIG. 2 and they have the same meaning.

The areas entered under the abscissa characterize again the valve control times, AO denoting again "outlet opens", AS "outlet closes" and EO "inlet opens" and ES "inlet closes" is added. Likewise deviating from FIG. 2, the lower dead center UT is represented, which lies in two-cycle engines in the middle of a scavenging phase of such an engine.

It can be seen from the course of curve $b$ that, starting point I, the exhaust pulse of cylinder 1 sets in, which works over the crank angle arc up to II. In the range from III to IV about the lower dead center of cylinder 1 the effect of the exhaust gas pressure wave of cylinder 5 is indicated by the slight increase of the pressure in exhaust gas pipe 11.

The exhaust gas pressure wave $b'$ caused in exhaust gas pipe 12 by the exhaust gas pulse of cylinder 5 is so transformed and displaced by means of modulator 13, 15, 17 and 18, that the pressure acting in exhaust gas pipe 11 does not exceed the mean scavenging pressure $m$ during the scavenging phase of cylinder 1. The above-described effect is illustrated by the course of curve $b$ between the points III and IV. More particularly, the scavenging phase of cylinder 1, between the points of time EO and ES, is the most important aspect because it is during this scavenging phase that cylinder 5 discharges burnt gases into the exhaust system. The exhaust valve from cylinder 5 opens at point III in the pressure profile $b$ concurrent with a rise in the pressure profile line $b'$ as measured in the exhaust pipe 12. It is for this reason that this pressure pulse within exhaust pipe 11 exhibits only a relatively slight rise between points III and IV of graph $b$. Thus, the mean scavenging pressure $m$ is not exceeded, and an effective scavenging operation is therefore assured. The breaking up of the intense amplitudes and the shift in the pressure peak to a different point of the crank angle $\phi$ is accomplished by the reversing tube 16, as well as the nozzles 13, 15 and the combining part 18.

The diagram also shows that the mean scavenging pressure $m$ is slightly above the effective pressure in the cylinder at the arc of the crank angle between EO and ES of cylinder 1 and that the exhaust gas pressure $p$ in exhaust gas pipe 11 on the point UT is also lower than the mean scavenging pressure $m$. Accordingly the scavenging of cylinder 1 is not disturbed by the preexhuast pressure wave of cylinder 5, though an instantaneous disturbance of the scavenging process could be caused, as indicated by the thin broken line $g$. Then a normal exhaust gas pressure wave of cylinder 3 sets in again, which is represented by the part between point V and VI of curve $b$.

The pressure waves fed to supercharger 20 are represented by curve $c$, this pressure course being measured directly before the inlet of the supercharger in mixing tube As in the case of the embodiment illustrated in FIGS. 1 and 2, it can be seen from the course of graph $c$ that main and auxiliary pressure waves are involved which indicate the effect of between the main pressure waves which indicate the effect of the modulator. But we see that with the different lengths of the transit times, different variations appear whose effect is already felt in most cases in the dropping flank of the pressure waves.

In practice it is not possible constructionally to adapt the length of the reversing tubes in slow-speed engines to the requirements. It is therefore suggested to increase the cross section of reversing tube 16 in these engines by a multiple, compared to the largest of these nozzle cross sections, so that a volume of at least twice that of a cylinder is obtained.

An auxiliary pressure wave entering reversing tube 16 is reduced in its amplitude at the increased cross section and propagates toward the closed end of reversing tube 16. There the auxiliary pressure wave is reflected and moves with its propagation rate toward nozzle 15. Only a part of the pressure wave can issue through the increased cross section to be fed again to supercharger 20. The remainder of the pressure wave is forced to pass again through the reversing tube, due to the reflection on the changed cross section. The residual part of the pressure wave reflects like the above-described auxiliary pressure wave, and the process repeats itself on the changed cross section so that several smaller partial waves of a single entering auxiliary pressure wave act again on the gas inlet of the supercharger and a disturbance of the scavenging process can be completely avoided in this manner.

The following auxiliary pressure waves which arrive in reversing tube 16 superpose the repeatedly reflecting residual pressure waves, so that the method of operation of the reversing tube with the widened cross section is improved.

The general disadvantage of the invention is that two-cycle-and four-cycle-internal combustion engines with five, seven, eight, 10, 11, 14 and more cylinders can be supercharged with this method without regard to the construction, and that the size and selection of the ignition intervals of the cylinders connected by exhaust gas pipes to the gas inlet of the supercharger no longer represents determinant influential factors.

The listing of the number of cylinders above does not mean, however, that the application of the method according to the invention is impossible in engines with groups of three cylinders combined on the exhaust gas side; rather above-mentioned advantages here are just as effective. But the qualifying fact remains that these internal combustion engines present much more favorable conditions in terms of supercharging so that the advantages that can be achieved with the method according to the invention manifest themselves only to a minor extent.

One of the most important advantages of the new supercharging method is the extremely good adaptation of the supercharging to the working range of the internal combustion engine. It is therefore possible to supercharge by the method of the invention both extremely high-speed and extremely low-speed internal combustion engines with any number of cylinders and of any construction without substantial additional technical expenditure, to use smaller turboloaders than heretofore, and in addition to eliminate completely mechanically operated auxiliary compressors.

We claim:

1. Apparatus for supercharging an internal combustion engine having at least five working cylinders from the compressor component of a single turbo-supercharger, each said cylinder having an exhaust pipe correlated therewith, and wherein the turbine component of the supercharger driven by the exhaust gases from the engine cylinders functions in accordance with a pulse mode of operation, which comprises nozzles provided respectively at the outlet ends of said exhaust pipes, a combining section into which all of said nozzles terminate, said combining section serving to decompose inherently present pre-exhaust pressure waves from the cylinders into main and auxiliary pressure waves, and a mixing tube having one end thereof connected to the outlet from said combining section and the other end connected to the inlet of the turbine component of said supercharger, the minimum length of at least some of said exhaust pipes as measured in meters being equal to the quotient of triple the mean velocity of sound of the exhaust gases in meters/sec. divided by the nominal speed of the engine in revolutions/min.

2. Apparatus as defined in claim 1 for supercharging an internal combustion engine wherein some of said exhaust pipes are shorter than said minimum length and which further includes a reversing tube closed at one end and being provided with a nozzle at the opposite end terminating within said combining section, the length of said reversing tube being at least equal to said minimum length.

3. Apparatus as defined in claim 1 for supercharging an internal combustion engine wherein the nozzles at the outlet ends of said exhaust pipes are combined in a node, and the cross-sectional area of said mixing tube is at least equal to the difference between a 2.5 fold cross-sectional area at the narrowest point of an exhaust pipe nozzle less half the sum of the cross-sectional areas at the narrowest point of all other nozzles.

4. Apparatus as defined in claim 1 for supercharging an internal combustion engine wherein the ratio of the cross-section $F_M$ of said mixing tube to the effective flow cross-section $F_T$ of the turbine component of said supercharger lies between 1.7 : 1 and 1 : 1, and is determined by the equation:

$$F_M/F_T = (5 - k/2) \cdot F_E/F_T$$

wherein
$F_M$ = cross-sectional area of the mixing tube.
$F_E$ = cross-sectional area of the exhaust pipe nozzles at their narrowest point, and
$k$ = number of exhaust pipes terminating within the combining section.

* * * * *